United States Patent [19]
Beach

[11] Patent Number: 4,678,300
[45] Date of Patent: Jul. 7, 1987

[54] APPARATUS AND METHOD FOR IDENTIFYING A FILM CARTRIDGE USED IN A PARTICULAR TYPE CAMERA

[75] Inventor: David E. Beach, Penfield, N.Y.

[73] Assignee: Eastman Kodak Company, Rochester, N.Y.

[21] Appl. No.: 775,296

[22] Filed: Sep. 12, 1985

[51] Int. Cl.$^4$ .............................................. G03B 7/00
[52] U.S. Cl. ..................................... 354/21; 354/106; 354/288
[58] Field of Search ............. 352/78 R, 78 C; 354/21, 354/105, 106, 107, 108, 109, 275, 288

[56] References Cited

U.S. PATENT DOCUMENTS

| | | | |
|---|---|---|---|
| 1,274,179 | 7/1918 | Maynes | 354/105 |
| 2,187,246 | 1/1940 | Nerwin | 88/1.5 |
| 3,490,844 | 1/1970 | Sapp, Jr. | 355/40 |
| 3,670,638 | 6/1972 | Lindsay | 95/31 |
| 3,672,277 | 6/1972 | Kobayashi | 95/31 |
| 4,443,077 | 4/1984 | Tanikawa | 354/21 |
| 4,490,027 | 12/1984 | Frank et al. | 354/21 |

*Primary Examiner*—Russell E. Adams
*Attorney, Agent, or Firm*—Roger A. Fields

[57] ABSTRACT

A film cartridge has indicator means arranged within a dedicated area on an exterior surface of the cartridge. The indicator means may be physically altered to provide a visible indication that the cartridge was used in a particular type camera requiring the exposed film to receive special handling at the photofinisher. An altering member is mounted on a back door of the camera to contact the indicator means of the cartridge, to physically alter the indicator means, in response to closing movement of the back door. Thus, the cartridge can be readily identified by the photofinisher as one that was used in the camera.

Preferably, the indicator means of the cartridge is constructed of a light-reflecting material which when disfigured by the altering member in the camera will reflect light diffusely. Apparatus at the photofinisher for determining whether the cartridge was used in the camera includes a photoconductive device for sensing the quantity of light reflected from the indicator means to a predetermined location. When the reflected light is scattered because the indicator means is disfigured, the quantity of reflected light reaching the photoconductive device is relatively low. The photoconductive device can therefore provide an indication that the cartridge was used in the camera.

8 Claims, 13 Drawing Figures

| OPERATING MODE | PSEUDO PAN | ACTUAL ZOOM | | | PSEUDO TELE (ZOOM) | | |
|---|---|---|---|---|---|---|---|
| CAMERA OBJECTIVE: | | | | | | | |
| ACTUAL FOCAL LENGTH | 35mm | 35mm | ← → | 80mm | 80mm | 80mm | 80mm |
| MAGNIFICATION | 1.0X | 1.0X | | 2.3X | 2.3X | 2.3X | 2.3X |
| EQUIVALENT FOCAL LENGTH | | | SAME AS ACTUAL | | 120mm | 160mm | 200mm |
| MAGNIFICATION | 1.0X | 1.0X | ← → | 2.3X | ← 3.4X → | ← 4.6X → | ← 5.7X → |
| FINDER IMAGE | 1:2 | 3½:5 | | 3½:5 | 3½:5 | 3½:5 | 3½:5 |
| WIDTH-TO-LENGTH RATIO | | | | | | | |
| PORTION OF NEGATIVE USED TO MAKE PRINT | 16.4x32.8mm | 23x32.8mm | | 23x32.8mm | 16.4x23.4mm | 12.8x16.3mm | 9.2x13.1mm |
| PRINT SIZE | 3½ x 7ins | 3½ x 5ins | | 3½ x 5ins | 3½ x 5ins | 3½ x 5ins | 3½ x 5ins |
| CODE FIDUIAL | 1000 | 0000 | | 0000 | 0100 | 0010 | 0001 |

FIG. 8

APPARATUS AND METHOD FOR IDENTIFYING A FILM CARTRIDGE USED IN A PARTICULAR TYPE CAMERA

CROSS-REFERENCE TO RELATED APPLICATIONS

Reference is made to commonly assigned, copending patent applications Ser. No. 765,977, filed Aug. 15, 1985 in the name of Donald M. Harvey and entitled PSEUDO FORMAT CAMERA AND SPECIAL FILM CARTRIDGE, and Ser. No. 775,271, filed Sept. 12, 1985 in the name of Donald M. Harvey and entitled CAMERA DEVICE FOR ENCODING CONVENTIONAL FILM CARTRIDGE.

BACKGROUND OF THE INVENTION

1. Field of the Invention

The invention relates generally to an apparatus and a method for identifying film cartridges used in a particular type camera, such as the pseudo format camera disclosed in the patent application cross-referenced above. More particularly, the invention relates to an apparatus and a method for physically altering film cartridges used in the pseudo format camera to distinguish the cartridges from other cartridges used in conventional format cameras. This is done in order to route film cartridges used in the pseudo format camera to corresponding equipment at the photofinisher for producing pseudo format prints.

2. Description of the Prior Art

A pseudo telephoto print is one that is made from a central portion of an exposure having the same width-to-length ratio, e.g., 3½:5, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

Commonly assigned U.S. Pat. No. 3,490,844, granted January 20, 1970, discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia which represents the selected portion of the subject; (5) processing the film to obtain a negative of the latent image of the subject; and (6) sensing the indicia to make a print of the selected portion of the subject from the negative.

When, in U.S. Pat. No. 3,490,844, the selected portion of the subject has the same relative position of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

Another patent, U.S. Pat. No. 4,357,102, granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unobscured portion of the window. Printing paper with a similar width-to-length ratio is used. Prints can thus be obtained which have a panoramic or elongate format, without using a panoramic lens.

Although U.S. Pat. No. 3,490,844 discloses a method of making pseudo telephoto prints from exposures taken without a telephoto lens, and U.S. Pat. No. 4,357,102 discloses a method of making pseudo panoramic prints from exposures taken without a panoramic lens, in each instance the exposures are made on film in a conventional (standard) cartridge. Thus, unless otherwise provided by the photographer, there is no indication to the photofinisher that the conventional cartridge was used in a pseudotelephoto or pseudo panoramic camera rather than a regular format camera. During the photofinishing process, a cartridge containing film on which exposures have been made for use in producing pseudo telephoto or pseudo panoramic prints will be indistinguishable from a cartridge containing film on which exposures have been made for use in producing normal prints. Consequently, film on which exposures have been made for use in producing pseudo telephoto or pseudo panoramic prints may not be correctly routed to the special equipment described in the patents for producing pseudo telephoto or pseudo panoramic prints.

DESCRIPTION OF THE CROSS-REFERENCED APPLICATIONS

The earlier filed cross-referenced application Ser. No. 765,977 discloses a camera adapted to receive a special film cartridge for taking exposures for use in producing pseudo telephoto and/or pseudo panoramic prints. The special cartridge is distinguishable physically from a conventional 35 mm cartridge, preferably by an absence of the spool extension which projects from one end of the conventional cartridge. This enables the special cartridge to be identified for routing at the photofinisher to corresponding equipment for producing pseudo telephoto and pseudo panoramic prints. Thus, with the special cartridge, there cannot be any failure by the photofinisher to identify the cartridge as one containing film on which exposures have been made for use in producing pseudo format prints.

The cross-referenced application Ser. No. 775,271 filed on the same date as this patent application discloses a pseudo format camera having magnetic means for encoding a conventional 35 mm cartridge with a macroscopic magnetic field, thereby providing an automatically determinable indication to the photofinisher that the cartridge was used in the pseudo format camera.

SUMMARY OF THE INVENTION

According to the invention, a film cartridge has indicator means arranged within a dedicated area on an exterior surface of the cartridge. The indicator means may be physically altered to provide a visible indication that the cartridge was used in a particular type camera requiring the exposed film to receive special handling at the photofinisher, such as in the example of a pseudo format camera. An altering member may be mounted on a back door of the camera to impinge against the indicator means of the cartridge, to physically alter the indicator means, in response to closing movement of the back door. Thus, in the example of the pseudo format camera, the cartridge can be readily identified by the photofinisher as one that is to be routed to special equipment for producing pseudo format prints.

In a preferred embodiment of the invention, the indicator means of the cartridge is a shiny light-reflecting area which when disfigured by the altering member in a pseudo format camera will reflect light diffusely, thereby providing an indication that the cartridge was used in the pseudo format camera. A loading chamber in the camera is shaped to receive the cartridge with its light-reflecting area exposed rearward in the camera at an opening to the loading chamber. The back door of the camera is pivotally supported remote from the loading chamber for closing movement to cover the opening. A striker is mounted on the back door to move into the opening and disfigure the light-reflecting area of the cartridge in response to closing movement of the door.

Apparatus at the photofinisher for determining whether the light-reflecting area of a cartridge has been disfigured includes a collimator for producing a beam of parallel rays of light and directing the beam onto the light-reflecting area. A photocell senses the quantity of light reflected from the light-reflecting area of the cartridge to a predetermined location. When the reflected light is scattered by the light-reflecting area because the area has been disfigured, the quantity of light reaching the photocell will be relatively low. The photocell, which has the property that its resistance changes as a function of the quantity of light falling one it, will provide an indication in the form of a relatively high resistance that the cartridge was used in a pseudo format camera.

BRIEF DESCRIPTION OF THE DRAWINGS

The invention will be described in connection with the drawings, wherein:

FIG. 8 is a chart for explaining how pseudo telephoto and pseudo panoramic prints are produced from film exposed in the camera.

DESCRIPTION OF THE PREFERRED EMBODIMENT

The invention is disclosed as being embodied preferably in a single-lens-reflex (SLR) 35 mm camera having a zoom objective lens. Because such a camera and lens are well known, this description is directed in particular to photogaphic elements forming part of or cooperating directly with the disclosed embodiment. It is to be understood, however, that other elements not specifically shown or described may take various forms known to persons of ordinary skill in the art.

Figure 1:
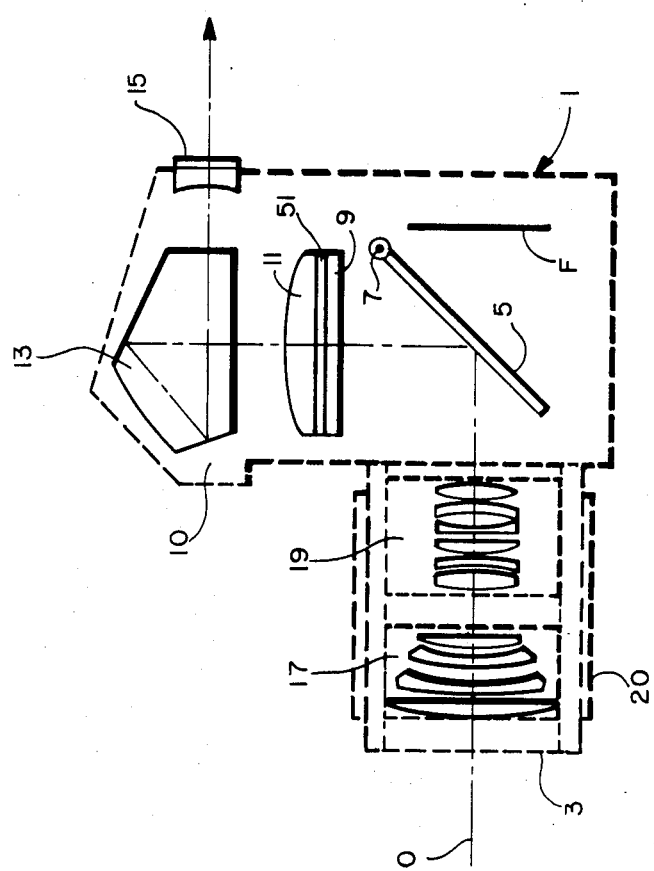
FIG. 1 is a side elevation view of a single-lens-reflex (SLR) camera adapted to receive a film cartridge for taking exposures for use in producing pseudo telephoto and pseudo panoramic prints.

Referring now to the drawings, and in particular to FIG. 1, there is shown a single-lens-reflex (SLR) 35 mm camera 1. The camera 1 includes an objective lens 3 for focusing an image of a subject being photographed on a frame section F of film in the camera. Conventional means, such as a pressure plate and a pair of rails, not shown, support the film frame F in the focal plane of the objective lens 3 to take an exposure. A flip-up mirror 5 is located between the objective lens 3 and the film frame F. The mirror 5 is normally disposed at an angle of 45°, centered on the optical axis O of the objective lens 3, but can flip up about a pivot pin 7 to lie flat. When the mirror 5 is disposed at the 45° angle, it reflects the rays of light that come through the objective lens 3 onto a ground glass screen 9 in a viewfinder 10 of the camera 1. A field lens 11 and a penta-roof prism 13 in the viewfinder 10 direct the light rays through an eye-lens 15 at the rear of the camera 1 to enable the subject to be photographed to be viewed through the objective lens 3. The prism 13 has three reflecting surfaces which turn the image formed by the objective lens 3 on the ground glass screen 9 upright as well as right-way-round. When the mirror 5 is flipped up to lie flat, it covers the underside of the ground glass screen 9 and the light rays from the objective lens 3 fall on the film frame F. The position of the mirror 5 is so arranged that when an image of the subject to be photographed is focused on the ground glass screen 9, with the mirror at the 45° angle, the same image falls into focus on the film frame F when the mirror is flipped out of the way. Finger pressure against a shutter release, not shown, on the outside of the body of the camera 1 flips the mirror 5 up. At first the light rays fall only on the blind of a focal plane shutter, not shown, but as the mirror 5 reaches the upper limit of its travel, it presses against a stop which releases the shutter blades to make the exposure.

Figure 4:
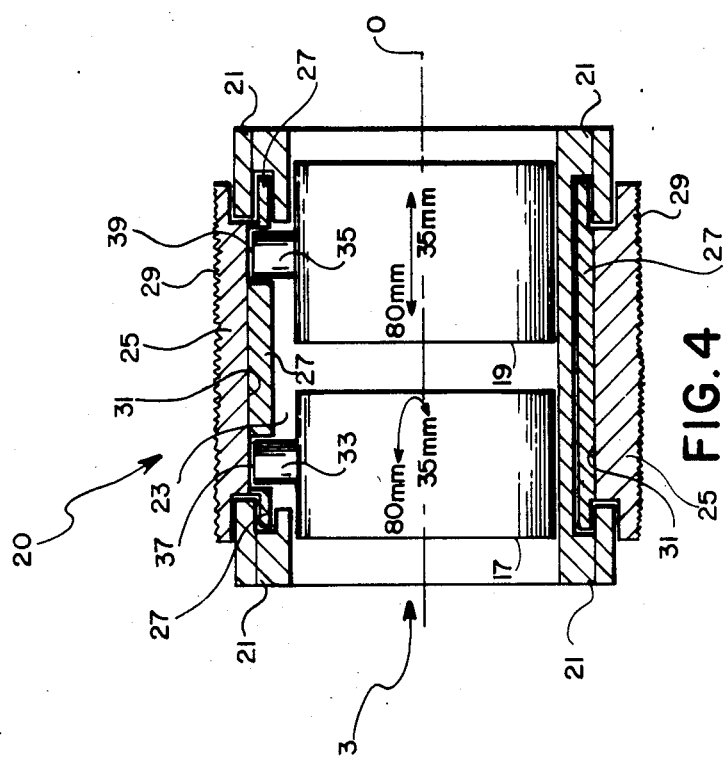
FIG. 4 is a partial sectional view of the camera objective and the manually operated member.
Figure 5:
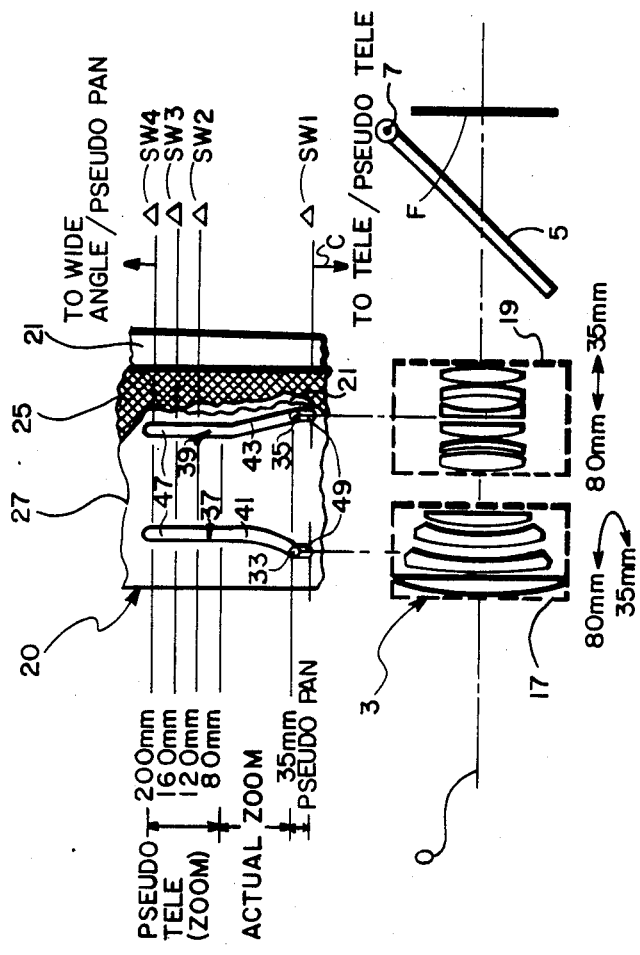
FIG. 5 is a schematic diagram of the camera objective and the manually operated member.

The objective lens 3 in the camera 1 is a known type of zoom lens, that is, a lens of variable focal length which can be adjusted continuously by movement of separate groups of elements in the lens to change the focal length of the lens. This is done in order to vary the angular field of view (coverage) of the objective lens 3 between a wide-angle limit and a telephoto limit. Alternatively, a lens assembly may be provided having a plurality of interchangable elements for changing the focal length or angular field of view. As shown in FIGS. 1, 4 and 5, the objective lens 3 includes a front four-element section 17 which moves in a double action path along the optical axis O, first back (rearward) and then forward as the focal length of the lens changed from a wide angle limit of, for example, 35 mm, to a telephoto limit of, for example, 80 mm. Conversely, a rear six-element section 19 of the objective lens 3 moves forward along the optical axis O in an almost smooth, linear path as the focal length of the lens is adjusted from 35 mm to 80 mm. At the shortest focal length of the objective lens 3, i.e., the wide-angle limit 35 mm, the front and rear sections 17 and 19 of the lens are farthest apart and the angular field of view is approximately 63°. At the longest focal length of the objective lens 3, i.e., the telephoto limit 80 mm, the angular field of view is approximately 28°. Thus, the field range of the objective lens 3 is 63° to 28°.

Figure 3:
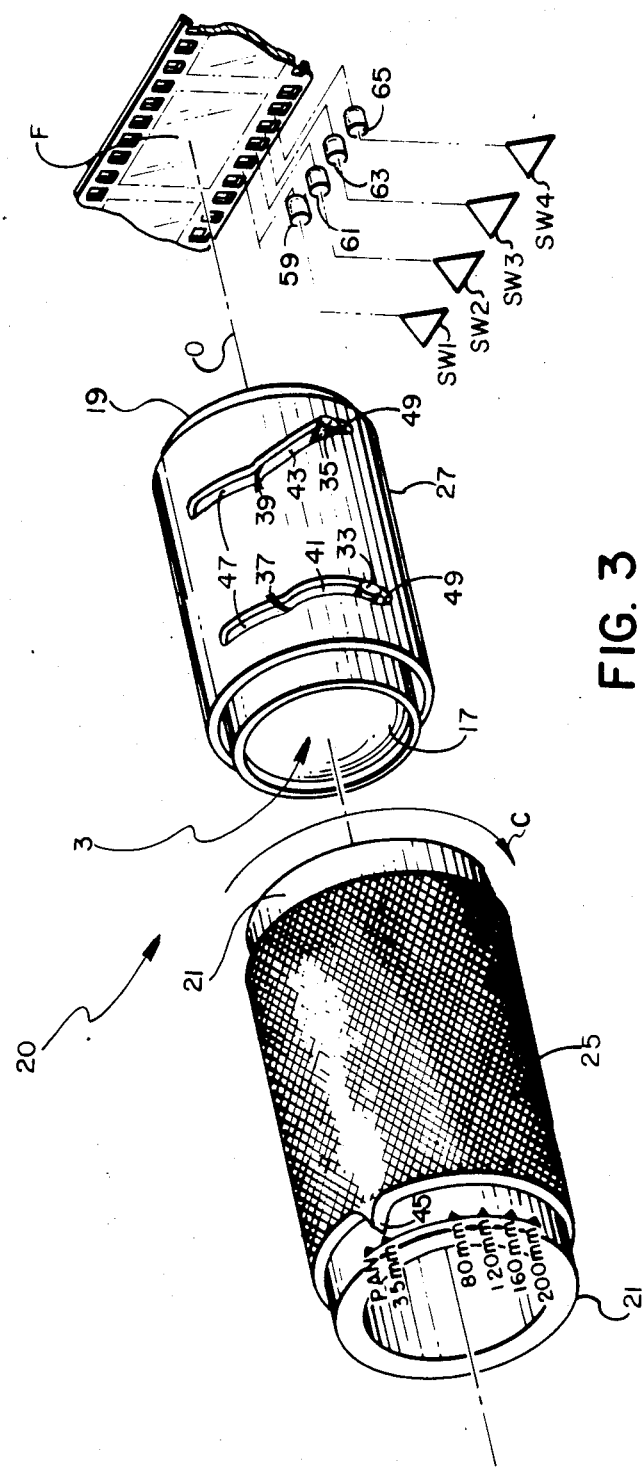
FIG. 3 is an exploded perspective view of the camera objective, a manually operated member for selecting a pseudo telephoto or pseudo panoramic field of view, and code means for encoding an exposure with indicia representative of the selected pseudo field of view.

Manually operated means 20 for moving the front and rear sections 17 and 19 of the objective lens 3 to adjust the lens to a selected focal length from 35 mm to 80 mm is shown in FIGS. 3-5. FIG. 3 shows the manually operated means 20 in an exploded perspective form. FIG. 4 shows such means 20 in a sectional form. FIG. 5 shows the means 20 in a rolled out (flat) elevational form. As seen in FIG. 4, a cylindrical barrel 21 fixed to the camera body supports the front and rear sections 17 and 19 of the objective lens 3 for movement along the optical axis O. The fixed barrel 21 has a semi-annular opening 23 which is bridged in light-trapping relation by an exterior zoom ring 25 and an interior cam ring 27. The zoom ring 25 has a knurled outer surface 29 and is secured at an inner surface 31 to the cam ring 27. The respective rings 25 and 27 are supported on exterior and interior surfaces of the barrel 21 for rotation relative to the barrel, about the front and rear sections 17 and 19 of the objective lens 3. The front and rear sections 17 and 19 have respective cam followers 33 and 35 which project into different-shaped cam slots 37 and 39 in the cam ring 27 to adjust the objective lens 3 from its 35 mm focal length to its 80 mm focal length or vice-versa. The different shape of the cam slots 37 and 39, and respective settings of the cam ring 27 for adjusting the objective lens 3 to the 35 mm focal length and the 80 mm focal length, are depicted in FIGS. 3 and 5. When, as viewed in FIGS. 3 and 5, the cam ring 27 is rotated in a clockwise direction C (by turning the zoom ring 25 in the same direction) from the 35 mm setting to the 80 mm setting of the cam ring, the front section 17 of the objective lens 3 first moves rearward and then moves forward because of a curved segment 41 of the cam slot 37. Simultaneously, the rear section 19 of the objective lens 3 simply moves forward because of a straight, inclined segment 43 of the cam slot 39. This movement of the front and rear sections 17 and 19 adjusts the objective lens 3 to continuously change its focal length from 35 mm to 80 mm.

A pointer 45 is provided on the zoom ring 25 for alignment with respective visible indications of the 35 mm and 80 mm settings of the cam ring 27. As shown in FIG. 3, the indications are embossed on the outside of the cylindrical barrel 21.

As is apparent from FIG. 5, the cam ring 27 can be rotated in the clockwise direction C beyond its 80 mm setting (by similarly turning the zoom ring 25) to a plurality of pseudo telephoto settings, 120 mm, 160 mm and 200 mm, without moving the objective lens 3 from its longest (telephoto) focal length 80 mm. This is possible because of respective, non-inclined, identical dwell segments 47 in the two cam slots 37 and 39. Conversely, the cam ring 27 can be rotated in a counter-clockwise direction beyond its 35 mm setting (by similarly turning the zoom ring 25) to a pseudo panoramic setting, without moving the objective lens 3 from its shortest (wide-angle) focal length 35 mm. This is possible because of respective, non-inclined, identical dwell segments 49 in the two cam slots 37 and 39. Visible indications of the pseudo telephoto settings 120 mm, 160 mm and 200 mm of the cam ring 27 and the pseudo panoramic setting of the cam ring are embossed on the outside of the cylindrical barrel 21, beyond the 80 mm and 35 mm indications on the barrel, for alignment with the pointer 45 on the zoom ring 25.

Figure 6C:
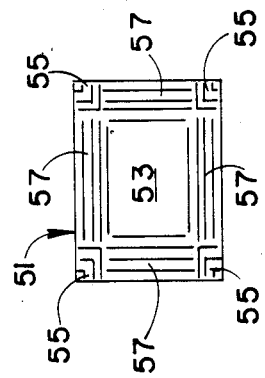
FIGS. 6a-6e are elevation views of the finder field in the viewfinder of the camera, illustrating operation of a liquid crystal display (LCD) masking unit for partially masking the viewing area in various degrees corresponding to the selected pseudo field of view.
Figure 6B:
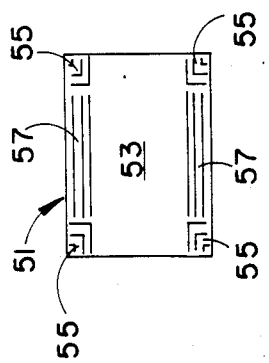
Figure 6E:
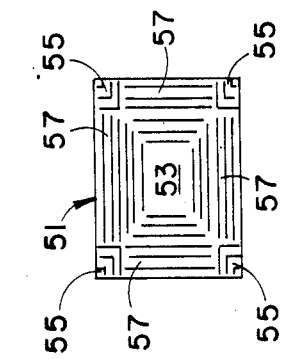
Figure 6A:
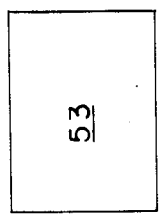
Figure 6D:
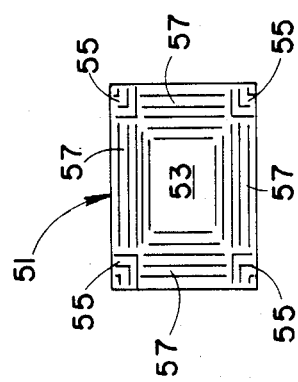

A flat, liquid crystal display (LCD) masking unit 51 is located in the viewfinder 10 of the camera 1 between the ground glass screen 9 and the field lens 11, as shown in FIG. 1. The LCD masking unit 51 is a variation of a known type of unit, such as described in U.S. Pat. No. 4,478,493, granted Oct. 23, 1984, and is depicted in FIGS. 6b-6e in various masking configurations in the finder field 53 of the viewfinder 10. The respective configurations correspond to the pseudo panoramic and pseudo telephoto settings of the cam ring 27. As shown in FIG. 6e, the masking unit 51 comprises four sets of right-angle insulated strips 55 of transparent, electrically conductive material arranged in side-by-side relation in the respective corner zones of the finger field 53 and four sets of elongate insulated strips 57 of the same material arranged in side-by-side relation in the upper, lower, left and right marginal zones of the finder field. Preferably, each set of the right-angle strips 55 includes three strips, and each set of the elongate strips 57 includes six strips. When the right-angle strips 55 and the elongate strips 57 are selectively energized in accordance with the pseudo panoramic or pseudo telephoto settings of the cam ring 27, they are individually rendered opaque to partially mask the finder field 53 in various degrees, as shown in FIGS. 6b-6e. FIG. 6a illustrates the finder field 53 as it appears with the masking unit 51 de-energized, which is the situation when the cam ring 27 is rotated from its 35 mm setting to its 80 mm setting or vice-versa. In this instance, none of the right-angle strips 55 or the elongate strips 57 are visible in the finder field 53. FIG. 6b illustrates the finder field 53 as it appears with the masking unit 51 minimally energized to provide a pseudo panoramic format, which is the situation when the cam ring 27 is in its pseudo panoramic setting. In this instance, three of the elongate strips 57 in the upper and lower marginal zones and all of the right-angle strips 55 in the corner zones are visible in the finder field 53. FIG. 6c illustrates the finder field 53 as it appears with the masking unit 61 further energized to provide a pseudo telephoto format akin to a 120 mm focal length, which is the situation when the cam ring 27 is in its 120 mm pseudo telephoto setting. In this instance, four of the elongate strips 57 in the upper, lower, left and right marginal zones and all of the right-angle strips 55 in the corner zones are visible in the finder field 53. FIG. 6d illustrates the finder field as it appears with the masking unit even further energized to provide a pseudo telephoto format akin to a 160 mm focal length, which is the situation when the cam ring is in its 160 mm pseudo telephoto setting. In this instance, five of the elongate strips in the marginal zones and all of the right-angle strips in the corner zones are visible in the finder field. FIG. 6e illustrates the finder field as it appears with the masking unit completely energized to provide a pseudo telephoto format akin to a 200 mm focal length, which is the situation when the cam ring is in its 200 mm pseudo telephoto setting. In this instance, all of the elongate strips and all of the right-angle strips are visible in the finder field.

In constrast to the electrically controlled LCD masking unit 51, a mechanically controlled masking unit may be provided in the viewfinder 10 of the camera 1. An example of a mechanical unit is shown in U.S. Pat. No. 3,212,422, granted Oct. 19, 1965. Alternatively, in place of the LCD masking unit 51, there may be provided a viewfinder having a manually operated carriage or slide on which is mounted a series of lenses and/or apertures of different sizes corresponding to the pseudo telephoto and pseudo panoramic formats. The slide would be supported for movement across the viewing axis of the viewfinder to locate the respective lenses and/or apertures at the axis to see a selected pseudo format in the viewfinder. In addition to the lenses and/or apertures for viewing the pseudo formats, the slide may include one or more lenses for viewing regular formats, e.g., 50 mm.

Four light emitting diodes (LED's) 59, 61, 63 and 65 are disposed in evenly spaced relation in the camera 1 for selective energization to spot-expose one of several possible code fiducials in binary form on a sensitive film area adjacent the film frame F, as shown in FIG. 3. Selective energization of the LED's 59, 61, 63 and 65 is controlled by individually closing respective switches SW1, SW2, SW3 and SW4. The closing of a switch SW1, SW2, SW3 or SW4 may be effected by a single closure member, not shown, on the cam ring 27 as the cam ring is positioned selectively in its pseudo panoramic and pseudo telephoto settings, i.e., pan, 120 mm, 160 mm and 200 mm. The binary form of the resulting code fiducial adjacent the film frame F indicates the particular pseudo setting of the cam ring 27, that is, the selected pseudo format. When the cam ring 27 is in its pseudo panoramic setting, the switch SW1 is closed and the LED 59 is energized. Thus, the binary form of the code fiducial is 1000. When the cam ring 27 is in its 120 mm, 160 mm or 200 mm pseudo telephoto settings, the switches SW2, SW3 or SW4 are closed and the LED's 61, 63 or 65 are energized, respectively. Thus, the binary form of the code fiducial is 0100, 0010 or 0001. When the cam ring 27 is rotated from its 35 mm setting to its 80 mm setting or vice-versa, the switches SW1–SW4 are open and none of the LED's are energized. Thus, the binary form of the code fiducial is, in effect, 0000.

Although not shown, it may be desirable for the LED 59 to be energized each time the cam ring 27 is in a pseudo panoramic or pseudo telephoto setting. In this instance, the LED 59 would provide a reference or pseudo-indicator fiducial for use in the printing process and the LED's 61, 63 and 65 would provide the code fiducials. Thus, the various codings might be 1000, 1100, 1010 and 1001 for the panoramic, 120 mm, 160 mm and 200 mm pseudo settings, respectively.

Besides controlling selective energization of the LED's 59, 61, 63 and 65 in accordance with rotation of the cam ring 27 to its pseudo panoramic and pseudo telephoto settings, the switches SW1–SW4 similarly control selective energization of the right-angle strips 55 and the elongate strips 57 of the LCD masking unit 51. Thus, the resulting code fiducial 1000, 0100, 0010 or 0001 adjacent the film frame F will be consistent with the masking configuration in the finder field 53 of the viewfinder 10.

Figure 7:
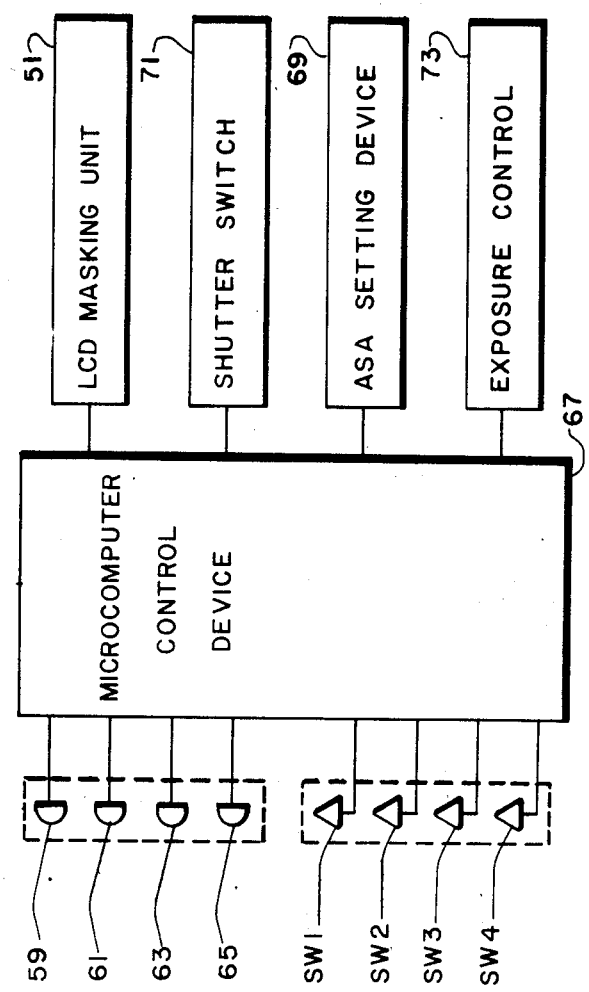
FIG. 7 is a schematic diagram of control circuitry in the camera.

FIG. 7 depicts a known microcomputer control device 67 which operatively couples the switches SW1–SW4 with the LCD masking unit 51 and the LED's 59, 61, 63 and 65. Examples of microcomputer-controlled cameras are disclosed in U.S. Pat. Nos. 4,295,715 and 4,509,843. A known ASA (film speed) setting device 69 is connected to the microcomputer device 67 to limit the intensity of an energized LED in accordance with the particular film speed of the 35 mm film loaded in the camera 1. A shutter switch 71 is connected to the microcomputer device 67 to delay energization of an LED, even though one of the switches SW1–SW4 is closed, until a focal plane shutter, not shown, is opened to take an exposure. When the focal plane shutter is opened, the shutter switch 71 is closed to energize an LED. Conversely, closing of the focal plane shutter causes the shutter switch 71 to re-open, thereby de-energizing the LED. A conventional exposure control circuit 73 is connected to the microcomputer device 67 to control the diaphragm aperture and the shutter speed. Such a circuit is disclosed, for example, in U.S. Pat. Nos. 4,493,547 and 4,515,457. The microcomputer device 67 may include a typical look-up table of exposure values which are individually selected according to which one of the switches SW1–SW4 is closed and the measure of brightness of reflected light provided by a photocell in the exposure control circuit 73. The selected exposure value is inputted to the exposure control circuit to set the diaphragm aperture and the shutter speed.

Referring now to FIG. 8, there is shown a chart for understanding how the camera 1 is used to exposure film frames from which pseudo panoramic and pseudo telephoto prints (as well as actual wide-angle to actual telephoto prints) can be obtained. For the most part, the chart is self-explanatory. For example, when the cam ring 27 is in its pseudo panoramic setting, the actual focal length of the objective lens 3 is the wide angle limit 35 mm. The finder field 53 is masked, as indicated, and the code fiducial 1000 is exposed adjacent the film frame F in response to the closing of the switch SW1. During the printing operation, sensing of the code fiducial 1000 causes the negative to be masked along its upper and lower marginal zones, as indicated, in conformity with the masking of the finder field 53. An enlargement is made of the narrowed, non-masked portion of the negative, i.e., 16.4×32.8 mm, to provide a pseudo panoramic 3½×7 ins. print similar to one obtained from an exposure made with a panoramic (rather than a 35 mm) lens. When the cam ring 27 is in its 200 mm pseudo telephoto setting, the actual focal length of the objective lens 3 is the telephoto limit 80 mm. The finder field 53 is masked, as indicated, and the code fiducial 0001 is exposed adjacent the film frame F in response to the closing of the switch SW4. During the printing operation, sensing of the code fiducial 0001 causes the negative to be masked along its upper, lower, left and right marginal zones, as indicated, in conformity with the masking of the finder field. An enlargement is made of the central, non-masked portion of the negative, i.e., 9.2×13.1 mm, to provide a pseudo telephoto 3½×5 ins. print similar to one obtained from an exposure made with a 200 mm rather than a 80 mm) lens. When the cam ring 27 is in its 120 mm telephoto setting, the actual focal length of the objective lens 3 is the telephoto limit 80 mm. The finder field 53 is masked, as indicated, and the code fiducial 0100 is exposed adjacent the film frame F in response to the closing of the switch SW2. During the printing operation, sensing of the code fiducial 0100 causes the negative to be masked along its upper, lower, left and right marginal zones, as indicated, in conformity with the masking of the finder field. An enlargement is made of the central, non-masked portion of the negative, i.e., 16.4×23.4 mm, to provide a pseudo telephoto 3½×5 ins. print similar to one obtained from an exposure made with a 120 mm (rather than a 80 mm) lens. When the cam ring is rotated from its 35 mm setting to its 80 mm setting or vice-versa, the focal length of the objective lens 3 is continuously changed between 35 mm and 80 mm. The finder field is not masked and no code fiducial (0000) is exposed on the film frame F, since each of the switches SW1–SW4 is open. Thus, an enlargement is made of a substantial portion of the negative, i.e., 23×32.8 mm.

Figure 2:
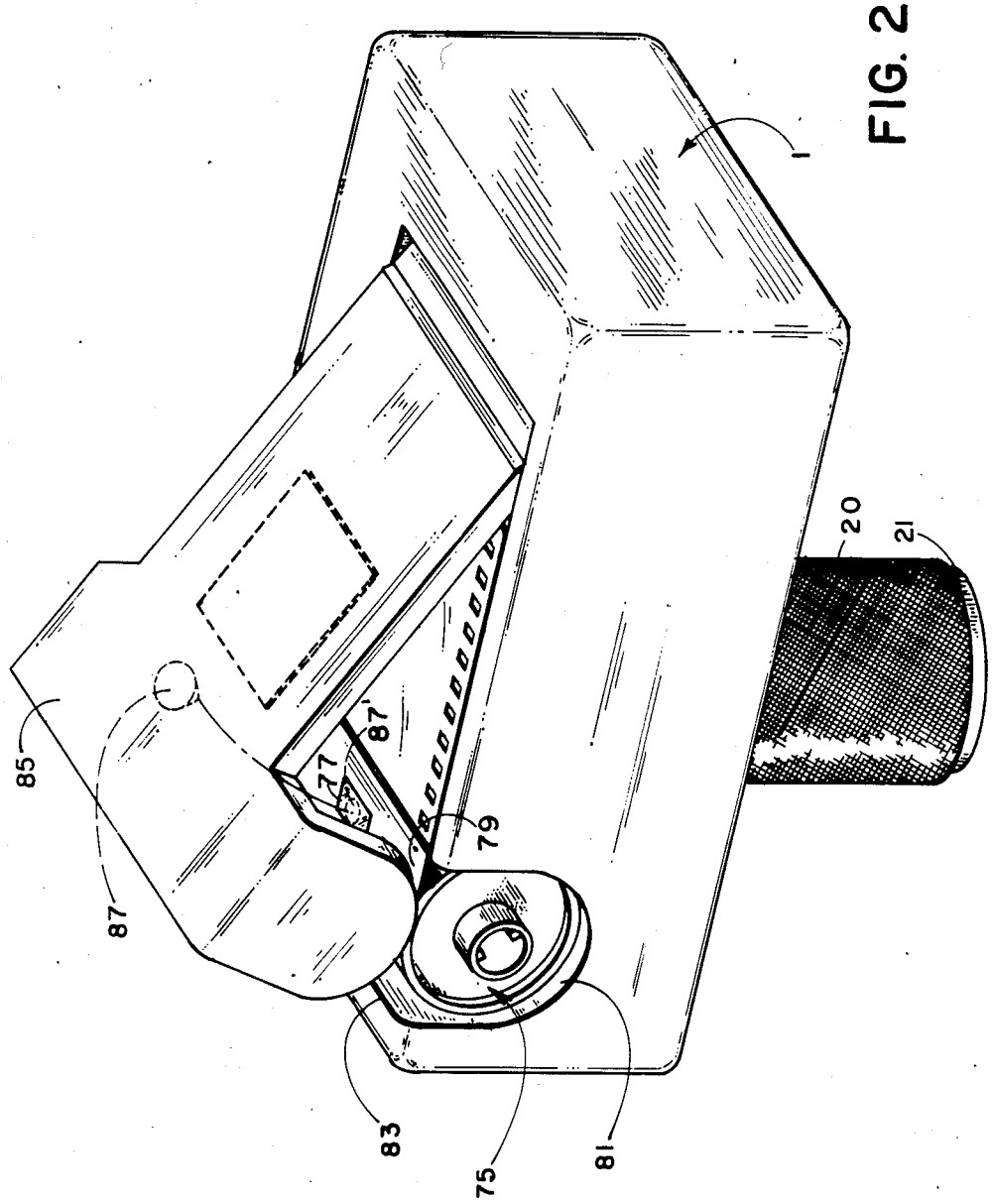
FIG. 2 is a rear perspective view of the camera and the cartridge, depicting the manner in which the camera alters the cartridge to identify the cartridge as one that was used in the camera, according to a preferred embodiment of the invention.

As shown in FIG. 2, a 35 mm film cartridge 75 has a discrete, dedicated, flat area 77 arranged on its exterior surface at a readily accessible location adjacent a lipped portion 79 of the cartridge. The area 77 is constructed of an impressionable light-reflecting material which when disfigured will scatter a beam of light directed onto the area. The purpose of providing a light-reflecting area on the cartridge which when disfigured reflects light diffusely will become apparent from the following description of the camera 1.

The camera 1 includes a loading chamber 81 which is shaped to receive the cartridge 75 with its light-reflecting area 77 exposed rearward in the camera at an opening 83 to the loading chamber, as shown in FIG. 2. A back door 85 of the camera 1 is pivotally supported remote from the loading chamber 81 for closing movement to cover the loading chamber, including its rear opening 83. A conically shaped striker 87 is fixed on the inside of the back door 85 to move point-first into the opening 83 and impinge against the light-reflecting area 77 of the cartridge 75 in response to closing movement of the back door 85. Appropriate abutments, not shown, are provided in the loading chamber 81 to support the cartridge at its lipped portion 79, to prevent rotation of the cartridge when the striker 87 impinges against the light-reflecting area 77 of the cartridge. The striker 87 creates an impression 87' in the light-reflecting area 77, thereby disfiguring the area to cause it to reflect light diffusely. Releasable means, not shown, secures the back door 85 in a closed position with the striker 87 slightly impressed in the light-reflecting area 77.

The cartridge 75 is disfigured in the camera 1 to enable a photofinisher to identify the cartridge as one that was used in the camera. Thus, the cartridge can be routed at the photofinisher to special equipment for producing pseudo telephoto and pseudo panoramic prints.

Figure 9:
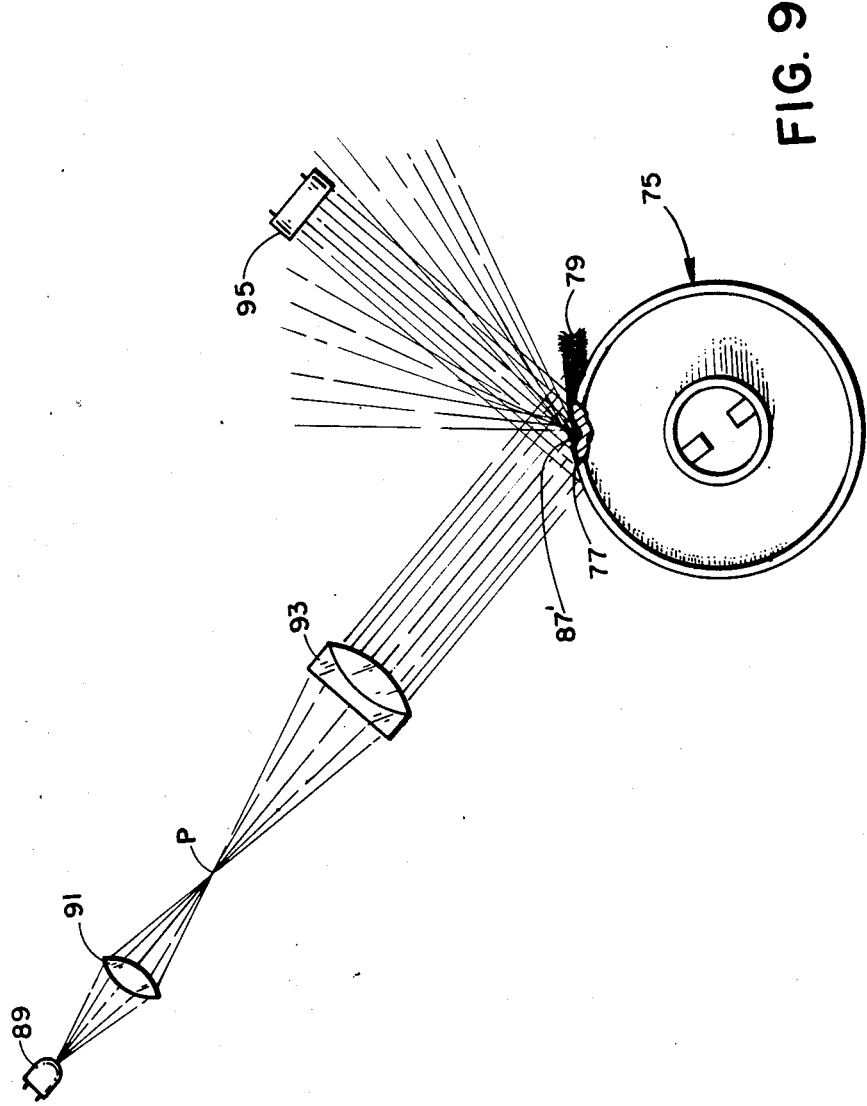
FIG. 9 is a schematic diagram depicting apparatus for determining whether a film cartridge was used in the camera.

Apparatus at the photofinisher for determining whether the cartridge 75 was used in the camera 1, that is, for determining whether the light-reflecting area 77 of the cartridge is disfigured, is shown in FIG. 9. The image of light from a bulb 89 with a tiny filament is focused by a microscope objective lens 91 at the focal point P of a collimating lens 93. The collimating lens 93 produces a beam of parallel light rays which is directed onto the light-reflecting area 77 of the cartridge 75. A photocell 95 senses the quantity of light reflected from the light-reflecting area 77 to the photocell. When the reflected light is scattered by the light-reflecting area 77 because the area has been disfigured, the quantity of reflected light reaching the photocell 95 will be relatively low. The photocell 95, which has the property that its resistance changes as a function of the quantity of light falling on it, will provide an indication in the form of relatively high resistance that the cartridge 75 was used in the camera 1. Consequently, the cartridge will be routed to special equipment for producing pseudo telephoto and pseudo panoramic prints. When the reflected light is not scattered by the light reflecting area 77 because the area is not disfigured, the quantity of reflected light reaching the photocell 95 will be relatively high. The photocell 95 will therefore provide an indication in the form of relatively low resistance that the cartridge 75 was used in a regular format camera, and the cartridge will then be routed to conventional equipment for producing normal format prints.

While the invention has been described with reference to a preferred embodiment, it will be understood that various modifications may be effected within the ordinary skill in the art without departing from the scope of the invention. For example, instead of the light-reflecting area 77 on the cartridge 75, other indicator means may be arranged on the cartridge which may be altered to provide an indication that the cartridge was used in the camera 1. The only requirement is that the indicator means be capable of being sensed at the photofinisher to identify the cartridge 75 for routing to special equipment for producing pseudo format prints.

Another indicator means which may be used on the cartridge is a friable conductive stripe over non-conducting paint or a friable insulating stripe over conducting material. In this instance, a flexible claw-like member mounted on the back door of the camera would scratch a detectable pattern in the stripe when the back door is closed.

The device in the camera for altering the indicator means on the cartridge to provide an indication that the cartridge was used in the camera may be mounted on some other movable member besides the back door of the camera. Preferably, such member would be actuated to cause the altering device to alter the indicator means in response to closing of the back door.

I claim:

1. In the combination of (a) a film cartridge, (b) a photographic camera having a loading chamber for receiving the cartridge, and (c) a back door supported for closing movement to cover said loading chamber, the improvement comprising:

said cartridge including a discrete dedicated area on an exterior surface of the cartridge and indicator means arranged within said dedicated area for physical alteration to provide a visible indication that the cartridge was used in said camera; and said camera including means mounted on said back door for movement when the door is closed to substantially contact said indicator means of a cartridge in said loading chamber for physically altering the indicator means, whereby a visible indication will be provided on the cartridge to indicate that said cartridge was used in the camera.

2. The improvement as recited in claim 1, wherein said indicator means of the cartridge is constructed of a material which is impressionable to provide a visible indication that said cartridge was used in said camera, and said altering means of the camera is a striker arranged at the predetermined location on said back door for impinging against said indicator means to create an impression in the indicator means when the back door is closed.

3. The improvement as recited in claim 2, wherein said loading chamber is shaped to receive a cartridge with its indicator means facing rearward in said camera and has an opening for exposing the indicator means, and said back door is pivotally supported remote from said loading chamber for closing movement to move said striker into said opening and against said indicator means to create an impression in the indicator means when the back door is closed.

4. The improvement as recited in claim 1, wherein said indicator means of the cartridge is constructed of a light-reflecting material which may be disfigured to scatter light reflected by said material in order to provide an indication that said cartridge was used in said camera, and said altering means of the camera is arranged at the predetermined location on said back door for disfiguring the indicator means when the back door is closed.

5. A photographic camera for use with a film cartridge having a dedicated area on the exterior surface of the cartridge which may be altered physically to provide a visual indication that the cartridge was used in the camera, said camera comprising:

means defining a loading chamber for receiving a cartridge with its dedicated area facing rearward in the camera and having an opening to expose the dedicated area;

a rear door pivotally supported remote from said loading chamber for closing movement to cover said opening; and means mounted on said rear door for movement into said opening to impinge against the dedicated area of a cartridge in said loading chamber and physically alter the dedicated area in response to closing movement of the rear door, whereby a visible indication will be provided on the cartridge to indicate that the cartridge was used in said camera.

6. A photographic camera for use with a film cartridge having a light-reflecting area on the exterior surface of the cartridge which may be disfigured to cause the area to reflect light diffusely, said camera comprising:

means defining a loading chamber for receiving a cartridge with its light-reflecting area facing rearward in the camera and having an opening to expose the light-reflecting area;

a rear door pivotally supported remote from said loading chamber for closing movement to cover said opening; and means mounted on said rear door for movement into said opening for disfiguring the light-reflecting area of a cartridge in said loading chamber in response to closing movement of the rear door, whereby the light-reflecting area will reflect light diffusely to indicate that the cartridge was used in said camera.

7. A film cartridge for use with a photographic camera having a cartridge-receiving chamber open at the rear of the camera to expose an exterior portion of a received cartridge and a rear door supported for closing movement to cover the exposed portion of the received cartridge and move a striker on the door against the exposed portion, said cartridge comprising:

a discrete dedicated area arranged on an exterior portion of the cartridge to lie in the path of the striker when said cartridge is in the chamber and the rear door is closed; and indicator means arranged within said dedicated area for physical alteration by the striker, whereby said indicator means will provide a detectable indication that said cartridge was used in the camera.

8. A film cartridge as recited in claim 7, wherein said indicator means is constructed of a light-reflecting material which may be disfigured by the striker to reflect light diffusely in order to provide the detectable indication.

* * * * *